A. E. METZGER.
BRAKE APPARATUS.
APPLICATION FILED DEC. 28, 1916.
1,223,192.
Patented Apr. 17, 1917.
2 SHEETS—SHEET 1.
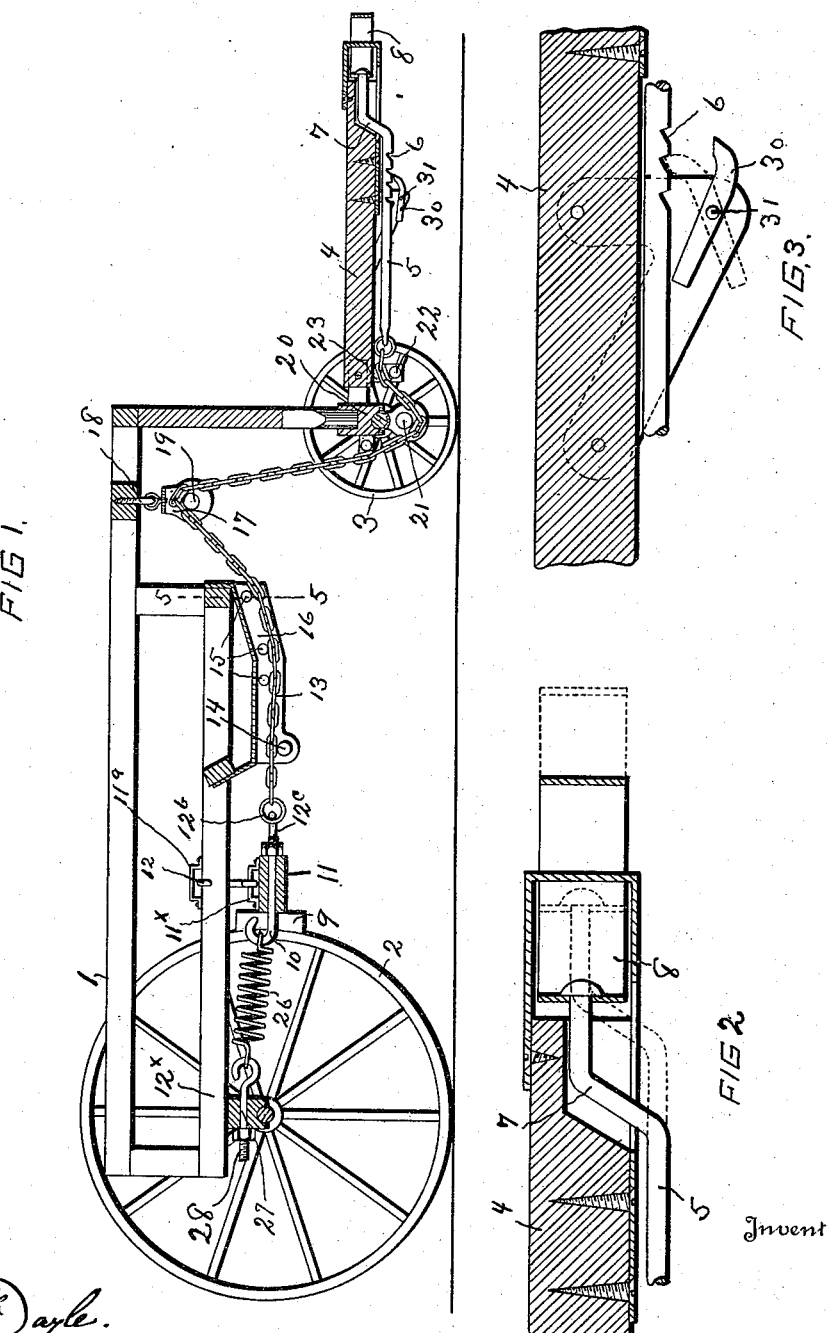

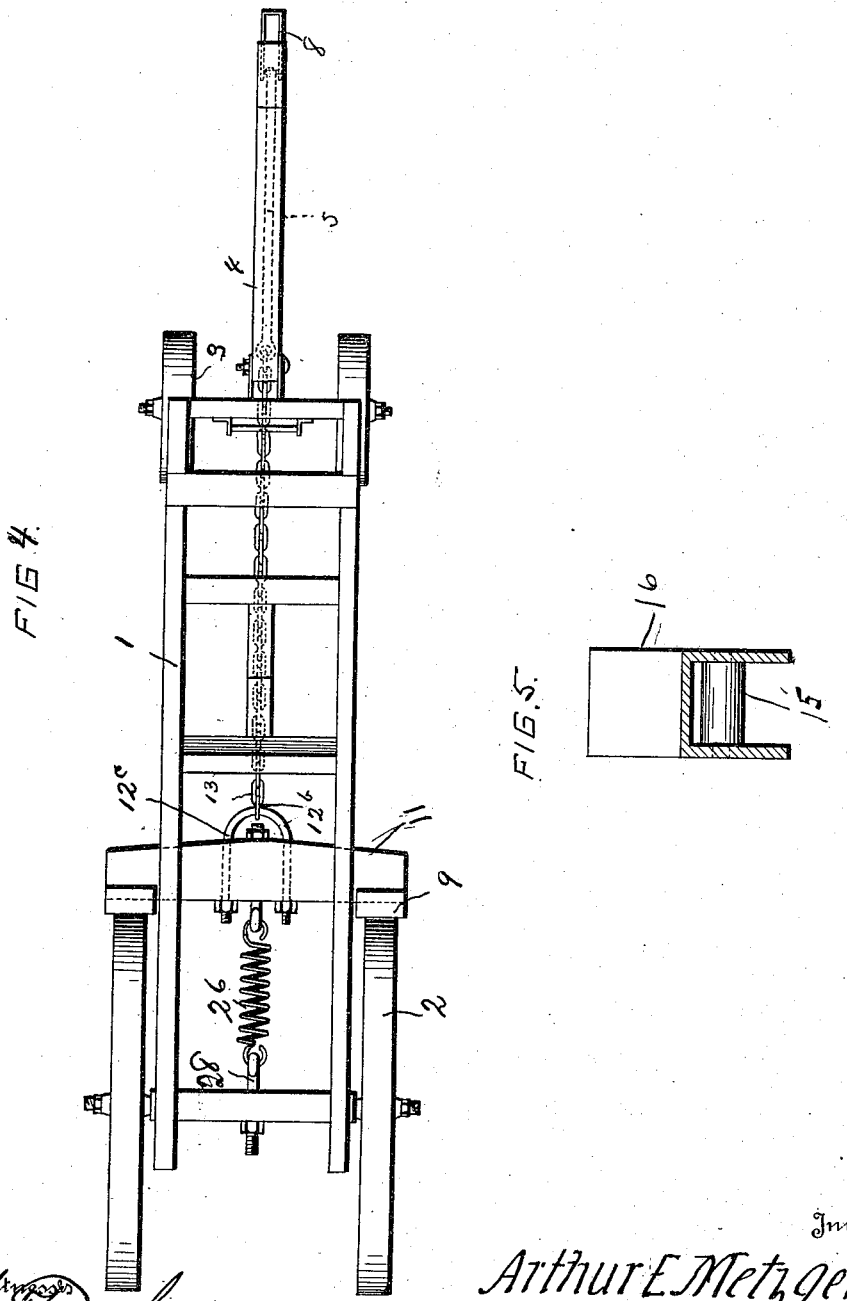

UNITED STATES PATENT OFFICE.

ARTHUR E. METZGER, OF BROWNING, ILLINOIS.

BRAKE APPARATUS.

1,223,192.     Specification of Letters Patent.     Patented Apr. 17, 1917.

Application filed December 28, 1916. Serial No. 139,331.

*To all whom it may concern:*

Be it known that I, ARTHUR E. METZGER, a citizen of the United States, residing at Browning, in the county of Schuyler and State of Illinois, have invented certain new and useful Improvements in Brake Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in brake mechanism for trailers of traction engines and consists of a simple and efficient means of this nature, having various details of construction, combinations and arrangements of parts which will be hereinafter fully described, shown in the accompanying drawings and then specifically defined in the appended claim.

My invention is illustrated in the accompanying drawings, in which:—

Figure 1 is a central vertical sectional view through a truck showing the application of my brake mechanism thereto.

Fig. 2 is an enlarged detail sectional view centrally through the tongue and parts attached thereto.

Fig. 3 is a central vertical sectional view showing in elevation means for holding the brakes from setting.

Fig. 4 is a top plan view.

Fig. 5 is a sectional view on line 5—5 of Fig. 1.

Reference now being had to the details of the drawings by numerals, 1 designates the truck of a trailer which may be of any kind and mounted upon the wheels 2 and 3. A tongue 4 is hinged to the truck, and 5 is a tractor bar having notches 6 therein, the forward end of said bar being bent at an angle as at 7 and connected to the clevis member 8 to which a traction engine is to be connected. A brake shoe is designated in the drawings by numeral 9, and 10 is a hook passing through the block 11 which has an angled member 11ˣ secured to the upper end thereof, and 12 designates a link connected at one end to said member 11ˣ and its other end fitted over the beam 12ˣ, forming a part of the truck. The member 11ª is fastened to said beam 12ˣ and serves to limit the movement of the link 12. A ring 12ᵇ, fastened to the chain 13, is connected to a curved rod 12ᶜ fastened to the block 11 by means of nuts, as shown clearly in Fig. 4 of the drawings. Said chain passes over the anti-friction rollers 14 and underneath the friction rollers 15 which are mounted in the opposite walls of the angled casing 16, the latter being fastened to the beams of the truck. A pulley hanger 17 is supported by a screw eye 18 and carries a pulley 19 over which the chain passes. Secured to the under side of the forward axle 20 of the truck is an anti-friction roller 21 under which the chain passes, and 22 is a roller supported by hangers 23, fastened to the rear end of the tongue and over which roller 22 the chain passes, the forward end of the chain being connected to an eye at the rear end of the draw bar 5.

A coiled spring 26 is connected at its forward end to the hook 10 and its other end to a hook 27 which passes through the rear axle of the truck and has a nut 28 fitted to the threaded end thereof, forming means whereby the tension of the spring may be regulated.

In operation, it will be noted that, when there is a pull upon the trailer, the spring 26 will be under tension and the shoe 9 will be drawn away from contact with the rear wheel of the truck and, in the event of any relaxation of the pull upon the trailer, the spring will cause the brake to automatically set and retard the movement of the trailer.

In the event of it being desired to back up the truck for any purpose and which would necessitate the releasing of the brake from the rear wheel, the pawl 30, pivotally mounted upon the pin 31, will be thrown into engagement with one of the notches 6 in the draw bar 5, thereby holding the spring under tension and the shoe from the wheel, after which, when it is desired to allow the brake to set, it may be done by releasing the pawl 30.

What I claim to be new is:—

A brake mechanism for trailers of traction engines, etc., comprising a truck with wheels thereon, a tongue secured to the truck, a spring-pressed brake shoe, a notched pull bar, a frame secured to the truck and carrying anti-friction rollers, a chain connecting said block, an anti-friction roller upon the forward axle of the truck over which said chain passes, and a pawl for engaging the notched pull bar.

In testimony whereof I hereunto affix my signature in presence of two witnesses.

ARTHUR E. METZGER.

Witnesses:
F. C. HAIST.
H. H. BLUM.

Copies of this patent may be obtained for five cents each, by addressing the "Commissioner of Patents, Washington, D. C."